(12) United States Patent
Kato et al.

(10) Patent No.: US 7,177,263 B2
(45) Date of Patent: Feb. 13, 2007

(54) RECORDING MEDIUM AND APPARATUS AND METHOD FOR MANUFACTURING THE SAME

(75) Inventors: Masahiro Kato, Tokorozawa (JP); Eiji Muramatsu, Tokorozawa (JP); Atsushi Yamaguchi, Tokorozawa (JP); Shoji Taniguchi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 390 days.

(21) Appl. No.: 10/698,422

(22) Filed: Nov. 3, 2003

(65) Prior Publication Data

US 2004/0090898 A1 May 13, 2004

Related U.S. Application Data

(62) Division of application No. 09/893,731, filed on Jun. 27, 2001, now Pat. No. 6,679,430.

(30) Foreign Application Priority Data

Jul. 4, 2002 (JP) .............................. 2000-202246

(51) Int. Cl.
*G11B 7/24* (2006.01)
(52) U.S. Cl. .................. 369/275.4; 428/64.1
(58) Field of Classification Search ............. 369/44.41, 369/59.1, 275.4, 275.3, 59.25; 428/64.1, 428/64.4
See application file for complete search history.

(56) References Cited

U.S. PATENT DOCUMENTS

| | | | |
|---|---|---|---|
| 4,423,502 A | 12/1983 | Dil ............................ | 369/275 |
| 4,996,682 A | 2/1991 | Yanagihara et al. ..... | 369/275.4 |
| 5,210,738 A | 5/1993 | Iwata et al. ............... | 369/275.1 |
| 5,602,824 A | 2/1997 | Ooki et al. ............... | 369/275.4 |
| 5,724,338 A | 3/1998 | Birukawa et al. ........ | 369/275.2 |
| 5,764,610 A | 6/1998 | Yoshida et al. ............ | 369/47.2 |
| 6,091,682 A | 7/2000 | Hikima .................... | 369/47.47 |
| 6,128,271 A | 10/2000 | Ohta ........................ | 369/275.4 |
| 6,137,756 A | 10/2000 | Yoshida et al. .......... | 369/53.36 |
| 6,181,657 B1 * | 1/2001 | Kuroda et al. ............. | 369/59.1 |
| 6,181,672 B1 | 1/2001 | Muramatsu et al. ..... | 369/275.4 |
| 6,208,614 B1 | 3/2001 | Kim ........................ | 369/275.4 |

(Continued)

FOREIGN PATENT DOCUMENTS

EP 108258 A1 5/1984

(Continued)

*Primary Examiner*—Tan Dinh
*Assistant Examiner*—Kim-Kwok Chu
(74) *Attorney, Agent, or Firm*—Drinker Biddle & Reath LLP

(57) ABSTRACT

A recording medium comprises pairs of groove tracks and land tracks provided side by side while being bent periodically, a plurality of land prepits previously formed on the land tracks and carrying information about the groove tracks, and a recording layer formed on at least the groove tracks and the land tracks. The land prepits have a radius of mean curvature smaller than a radius of mean curvature of sides of the groove tracks in land-prepit absent regions of the land prepits and are defined by curved surfaces continuously extending from the sides of the groove tracks. Those sides of the groove tracks which face the continuous curved surfaces of the land prepits are curved surfaces that stricture the groove tracks.

11 Claims, 9 Drawing Sheets

U.S. PATENT DOCUMENTS

| | | | |
|---|---|---|---|
| 6,304,535 B1 | 10/2001 | Magome et al. | 369/53.2 |
| 6,335,070 B1 * | 1/2002 | Tomita | 428/64.1 |
| 6,404,729 B1 * | 6/2002 | Yamaoka et al. | 369/275.4 |
| 6,473,377 B2 | 10/2002 | Eguchi et al. | 369/53.2 |
| 6,487,163 B1 | 11/2002 | Sugaya et al. | 369/275.4 |
| 6,507,558 B2 | 1/2003 | Aoki | 369/275.3 |

FOREIGN PATENT DOCUMENTS

| | | |
|---|---|---|
| EP | 0 786 767 | 7/1997 |
| EP | 1 043 714 | 10/2000 |
| JP | 11-096555 | 4/1999 |
| JP | 2000-11460 | 1/2000 |
| WO | WO 01/01404 A1 | 1/2001 |

* cited by examiner

RECORDING MEDIUM AND APPARATUS AND METHOD FOR MANUFACTURING THE SAME

This application is a Division of Ser. No. 09/893,731 Jun. 27, 2001 now U.S. Pat. No. 6,679,430.

BACKGROUND OF THE INVENTION

1. Field of the Invention

The present invention relates to a recording medium, such as an optical disk or optical card and an apparatus and method for manufacturing the recording medium.

2. Description of the Related Art

Recordable recording media, particularly a write once DVD-R (Digital Versatile Disc-Recordable) and rewritable DVD-RW (Digital Versatile Disc-Re-recordable) (hereinafter those media will be generically called DVDs) have already been manufactured. Previously recorded on a DVD are address information needed to look for a target position at the time of recording data, such as image information, and rotation control information, such as a wobbling signal, which is used in controlling the rotation of a disk. (Hereinafter, those information will be generically called pre information.)

The rotation control information is recorded by previously wobbling data-recording tracks (groove tracks or land tracks) to a waveform of a given amplitude at a predetermined frequency (wobbling frequency) in the preformat phase at the time of manufacture.

At the time of actually recording data on a DVD, therefore, the wobbling frequency of the wobbled tracks is detected, a reference clock for controlling the rotation of the DVD is extracted based on the wobbling frequency, and a drive signal for controlling the rotation of the spindle motor that rotates the DVD based on the extracted reference clock and a recording clock signal including timing information which is synchronous with the rotation of the DVD are generated.

Further, address information indicating an address on the DVD that is needed at the time of recording data is recorded by forming prepits corresponding to the pre information is formed on a track lying between two tracks (e.g., a land track). Further, the prepits are formed nearly uniformly over the entire surface of the DVD so that the reference clock can be reproduced even from the prepits as needed.

FIG. 1 shows one example of a recording layer on a DVD and the cross section of the DVD. As illustrated, convex groove tracks GV and recessed land tracks LD are previously and alternately formed on the recording layer of, for example, a phase change material on the DVD spirally or concentrically. That is, pairs of both tracks are repeatedly laid side by side.

Formed on the land tracks LD beforehand are addresses indicating positions on the groove tracks GV and relating information, such as a plurality of land prepits LPP which carry the recording timing. Each of the land prepits LPP is formed in such a way as to couple both adjoining groove tracks GV, and the surface of each land prepit LPP is level with the surfaces of the associated groove tracks GV.

FIG. 1 shows a mode before data to be recorded (audio data, video data and computer data) by an information recording and reproducing apparatus is recorded. While FIG. 1 linearly shows the individual groove tracks GV, the groove tracks GV are actually wobbled at a frequency corresponding to the rotational speed of the DVD. That is, pairs of the land tracks LD and groove tracks GV are provided side by side while being bent periodically.

The information recording and reproducing apparatus that records data on a DVD irradiates and focuses a recording light beam according to data on a groove track GV as shown in FIG. 2 while identifying a position on the groove track GV by detecting a land prepit LPP from the DVD. At this time, the portion where the recording light beam has been irradiated is heated, thereby forming a record marker portion M whose reflectance differs from the ambient reflectance on that portion of the groove track GV. As a land prepit LPP that carries information, such as an address, about one groove track is formed on the outer track side of the groove track, a land prepit LPP on the outer track side of each track is detected as shown in FIG. 2.

The information recording and reproducing apparatus has a prepit detecting unit which detects a land prepit LPP. The prepit detecting unit includes a 4-split photodetector 1 as shown in FIG. 3. The 4-split photodetector 1 is comprised of a photoelectric converting device having four light-receiving surfaces $1a$ to $1d$ separated into four segments by a direction along the groove tracks GV of the DVD and a direction perpendicular to the groove tracks. The light-receiving surfaces $1a$ and $1d$ are positioned on the outer track side of the DVD while the light-receiving surfaces $1b$ and $1c$ are positioned on the inner track side of the DVD.

A read light beam generator irradiates a read light beam on the DVD that is rotated by the spindle motor, thereby forming a beam spot on the recording layer. The photoelectric converting device detects reflected light of the information reading spot from the DVD at the four light-receiving surfaces $1a$–$1d$ and outputs reception signals Ra to Rd or electric signals corresponding to the amounts of light respectively detected by the light-receiving surfaces $1a$–$1d$. The reception signals Ra and Rd associated with the light-receiving surfaces $1a$ and $1d$ positioned on the outer track side of the DVD are supplied to an adder 2, and the reception signals Rb and Rc associated with the light-receiving surfaces $1b$ and $1c$ positioned on the inner track side of the DVD are supplied to an adder 3. The adder 2 adds the light-receiving surfaces Ra and Rd, and the adder 3 adds the light-receiving surfaces Rb and Rc. Further, a subtracter 4 subtracts the output signal of the adder 3 from the output signal of the adder 2, and provides an output signal as a radial push-pull signal.

When the irradiated beam spot is on a position centering a groove track GV carrying no data in center and including a land prepit LPP as shown in FIG. 2, the diffraction of the light beam reduces the amounts of reflected light to the light-receiving surfaces $1a$ and $1d$ of the photodetector 1 and increases the amounts of reflected light to the light-receiving surfaces $1b$ and $1c$. As a result, the level of the output signal of the adder 2 falls below the level of the output signal of the adder 3. Therefore, the radial push-pull signal output from the subtracter 4 in association with the position of the land prepit LPP has a waveform with a sharp trough as shown in FIG. 4. The radial push-pull signal is supplied to a binarization circuit 5 and is binarized with a predetermined threshold value to detect the land prepit LPP.

When the recording light beam is irradiated on a land prepit LPP to form the data-carrying record marker portion M, the heat generated by the irradiation of the recording light beam is transferred to a part of the land prepit LPP from the groove track GV. This forms a record marker portion M1 with a larger area than that of the record marker portion M of the groove track in a land-prepit absent region as shown in FIG. 2.

When information data is reproduced from the data-recorded DVD, therefore, the waveform of a read signal obtained at the time of reading the record marker portion M1 near the land prepit LPP may have distortion, which leads to a higher read error ratio.

OBJECT AND SUMMARY OF THE INVENTION

Accordingly, it is an object of the present invention to provide a recording medium which provides read signals with less waveform distortion at the time of reproducing information, and an apparatus and method for manufacturing the recording medium.

A recording medium according to the present invention comprises pairs of groove tracks and land tracks provided side by side while being bent periodically, a plurality of land prepits previously formed on the land tracks and carrying information about the groove tracks, and a recording layer formed on at least the groove tracks and the land tracks.

The land prepits have a radius of mean curvature smaller than a radius of mean curvature of sides of the groove tracks in land-prepit absent regions where the land prepits do not exist and are defined by curved surfaces continuously extending from the sides of the groove tracks.

Those sides of the groove tracks which face the continuous curved surfaces of the land prepits are curved surfaces that stricture the groove tracks.

In one aspect of the recording medium according to the invention, said groove tracks have sides of a first amplitude and said land prepits have sides of a second amplitude greater than said first amplitude.

In another aspect of the recording medium according to the invention, said land prepits are located apart from adjoining groove tracks.

In a further aspect of the recording medium according to the invention, a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range.

In a still further aspect of the recording medium according to the invention, said predetermined value is 0.05 and said predetermined range is 0.18 to 0.27.

A method of manufacturing a recording medium according to the present invention, in which the recording medium has pairs of groove tracks and land tracks provided side by side while being bent periodically, a plurality of land prepits previously formed on said land tracks and carrying information about said groove tracks, and a recording layer formed on at least said groove tracks and said land tracks, comprises the steps of:

forming said groove tracks extending by irradiating a spot of a cutting light beam, which moves relatively to a recording master disk, on a photoresist layer formed on said recording master disk; and shifting said spot of said cutting light beam in a direction perpendicular to a direction in which said groove tracks extend, returning said shifted spot to a position where said groove tracks should extend, thereby forming said land prepits having sides defined by curved surfaces continuously extending from sides of said groove tracks, and making those sides of said groove tracks which face said sides of said land prepits having curved surfaces that stricture said groove tracks.

In one aspect of the method according to the invention, said sides of said land prepits have a radius of mean curvature smaller than a radius of mean curvature of sides of said groove tracks in non-present regions of said land prepits.

In another aspect of the method according to the invention, said spot is caused to wobble with a first amplitude in said step of forming said groove tracks, and said spot is caused to wobble with a second amplitude greater than said first amplitude in said step of forming curved sides which stricture said groove tracks and curved sides which define said land prepits.

In a further aspect of the method according to the invention, a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range.

In a still further aspect of the method according to the invention, said predetermined value is 0.05 and said predetermined range is 0.18 to 0.27.

An apparatus for manufacturing a recording medium according to the present invention, in which the recording medium has pairs of groove tracks and land tracks provided side by side while being bent periodically, a plurality of land prepits previously formed on said land tracks and carrying information about said groove tracks, and a recording layer formed on at least said groove tracks and said land tracks, comprises:

a track forming section for forming said groove tracks extending by irradiating a spot of a cutting light beam, which moves relatively to a recording master disk, on a photoresist layer formed on said recording master disk; and a land-prepit forming section for shifting said spot of said cutting light beam in a direction perpendicular to a direction in which said groove tracks extend, returning said shifted spot to a position where said groove tracks should extend, thereby forming said land prepits having sides defined by curved surfaces continuously extending from sides of said groove tracks, and making those sides of said groove tracks which face said sides of said land prepits having curved surfaces that stricture said groove tracks.

In one aspect of the apparatus according to the invention, said sides of said land prepits have a radius of mean curvature smaller than a radius of mean curvature of sides of said groove tracks in non-present regions of said land prepits.

In another aspect of the apparatus according to the invention, said spot is caused to wobble with a first amplitude in said track forming section, and said spot is caused to wobble with a second amplitude greater than said first amplitude in said land-prepit forming section.

In a further aspect of the apparatus according to the invention, a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land-prepits to lie within a predetermined range.

In a still further aspect of the apparatus according to the invention, said predetermined value is 0.05 and said predetermined range is 0.18 to 0.27.

DETAILED DESCRIPTION OF THE PREFERRED EMBODIMENTS

A preferred embodiment of the present invention will now be described in detail referring to the accompanying drawings.

Figure 5:
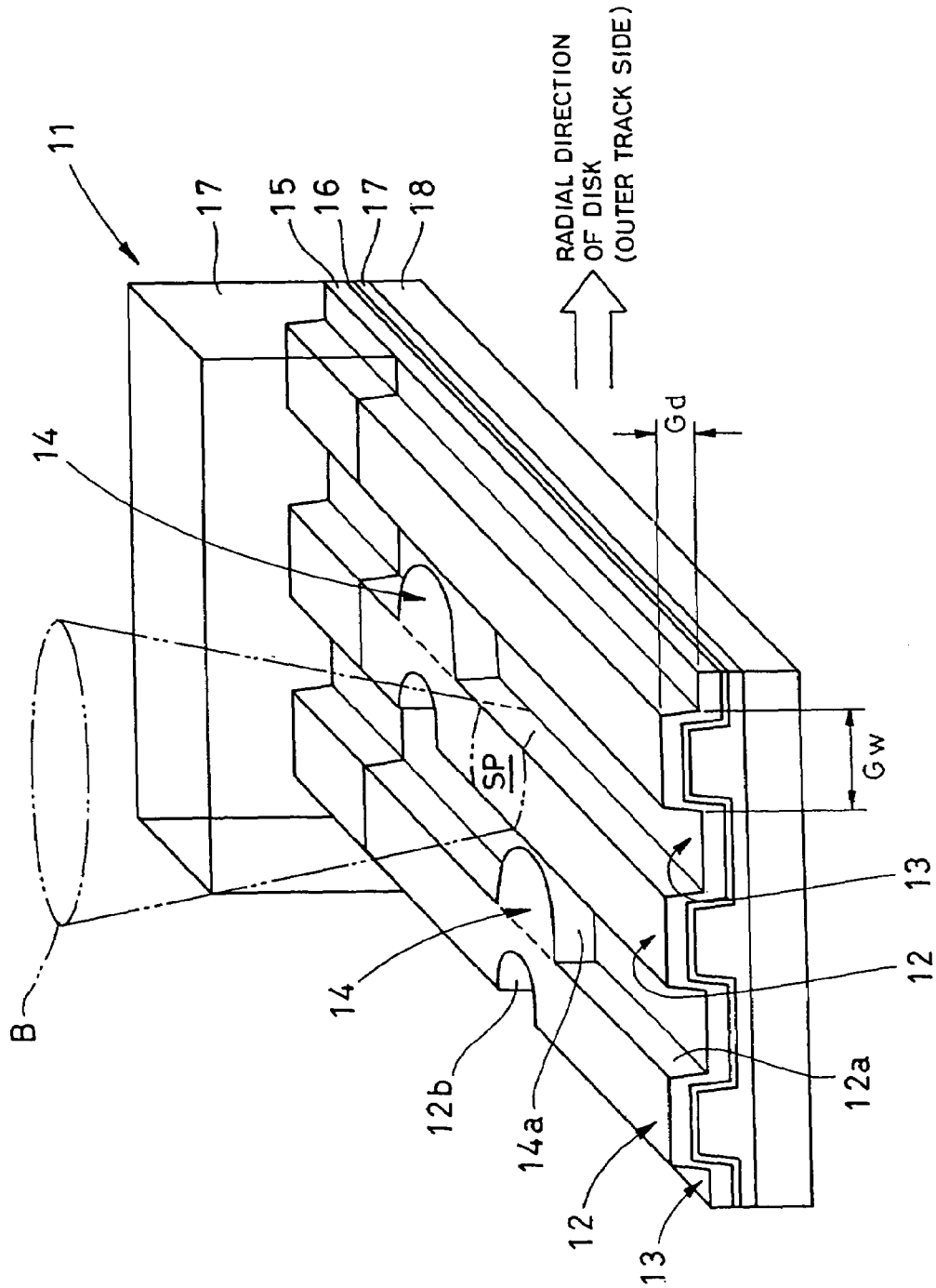
FIG. 5 is a partly cutaway perspective view of a DVD according to the present invention.

FIG. 5 shows an example of a rewritable phase change type optical disk. The optical disk (DVD-RW) 11 includes a recording layer 15 which has a medium layer formed of a phase change material, such as Ag—In—Sb—Te, and glass protection layers of, for example, $ZnS$—$SiO_2$ sandwiching the medium layer. Groove tracks 12 and land tracks 13 are formed on the recording layer 15. The pair of the land and groove provided side by side guides a laser beam B as reproduction or recording light. The optical disk 11 has a reflection layer 16 for reflecting the light beam B, a transparent substrate (polycarbonate) 18 and an adhesive layer 19. Provided on the beam incident side is a transparent film (polycarbonate) 17 which protects those layers.

Figure 6:
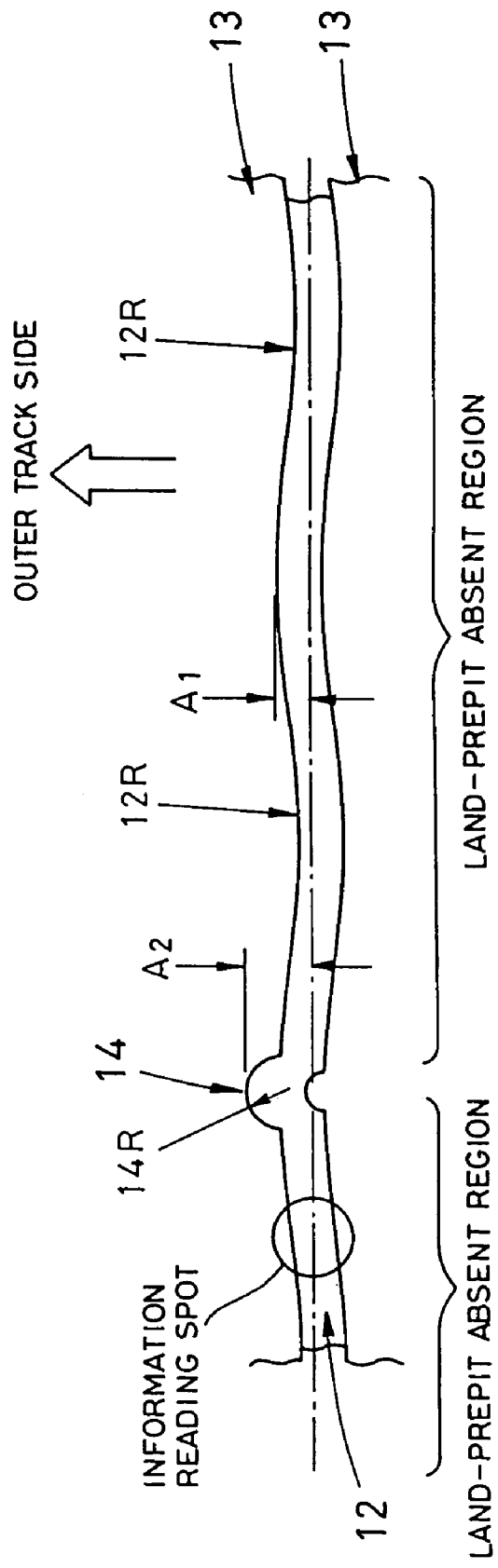
FIGS. 6 and 7 are partial plan views of the DVD according to the present invention.
Figure 7:
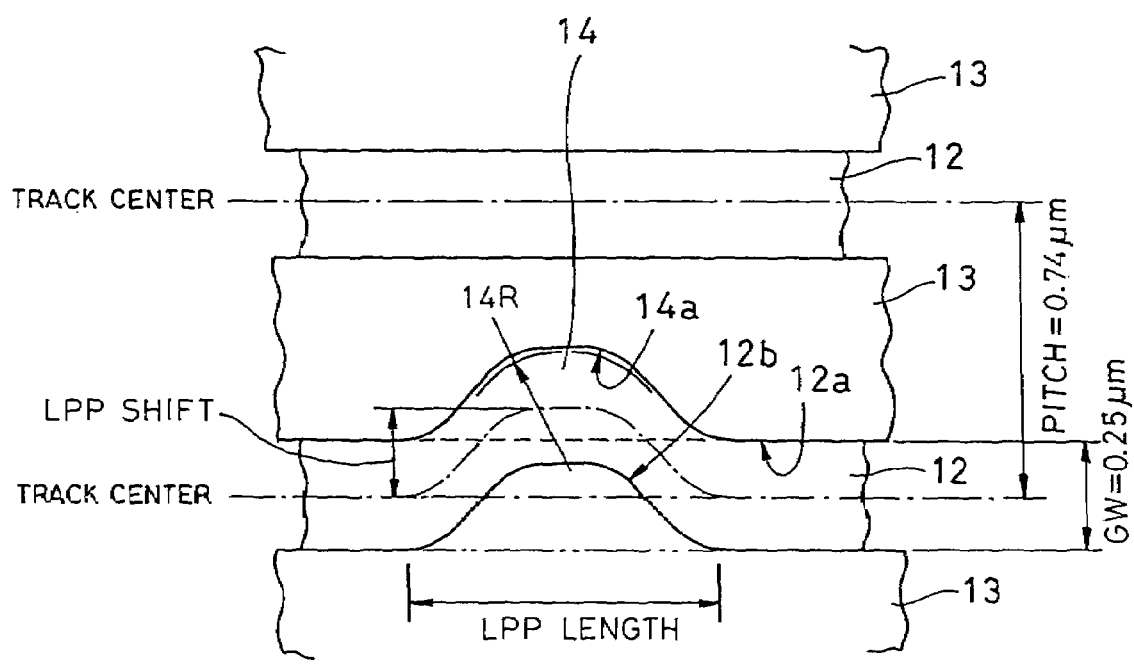

Land prepits 14 corresponding to pre information are formed beforehand on the land tracks 13 on the optical disk 11. As shown in FIG. 5, a side 14a of each land prepit 14 has a curved surface of a radius of mean curvature smaller than the radius of mean curvature of a side 12a of each groove track 12 in a land-prepit absent region where no land prepits exist and is so formed as to be continual from the side 12a of the groove track 12 in the land-prepit absent region. As the groove track 12 is wobbled at a predetermined frequency, the side of the groove track 12 is cut nearly flat or cut with a relatively gentle curve of a large radius of curvature 12R on the flat surface of the disk as shown in FIG. 6 and part of pre information is recorded as a wobbling frequency in the land-prepit absent region. Therefore, the radius of mean curvature of the side 12a of the groove track 12 becomes relatively large. According to this embodiment, the side 14a of the land prepit 14 is cut with a sharp curve (the radius of curvature 14R of the land prepit 14) considerably smaller than the large radius of curvature 12R of the groove track 12 as shown in FIGS. 6 and 7. Apparently, each groove track 12 has a side of a first amplitude A1 from a center line (two-dot chain line), and each land prepit 14 has a side of a second amplitude A2 greater than the first amplitude A1.

A side 12b of the groove track 12 which faces the side 14a of the land prepit 14 is a curved surface stricturing the groove track 12 or making it narrow. It is preferable to form the side 12b of the groove track 12 in such a way as to be strictured to the extent where it does not reach the extension line (indicated by the broken line in FIG. 7) of the side of the opposing groove track 12. This is because when a record marker M to be recorded later is formed in a portion adjacent to the land prepit, the amount of reflected light from the record marker M decreases.

The recording operation to the phase change type optical disk will now be discussed. At the time user data (data other than pre information and such as image information to be recorded later by a user) is recorded on the optical disk 11, as shown in FIG. 5, the information recording apparatus extracts the wobbling frequency of the groove track 12 so that the optical disk 11 is rotated at a predetermined rotational speed. At the same time, the land prepit 14 is detected to acquire pre information based on which the optimal power of the recording light beam B or the like is set. As the land prepit 14 is detected, address information indicating a position on the optical disk 11 where user data is to be recorded is acquired and the user data is recorded at the corresponding position based on the address information. The user data that is recorded on the optical disk 11 is recorded on the center line of the groove track 12 as a record marker portion having a different reflectance.

User data is recorded by forming a record marker portion corresponding to the user data on the groove track 12 by irradiating the light beam B in such a way that the center of the light beam B matches with the center of the groove track 12. At this time, the size of a beam spot SP is set so that part of the beam spot SP is irradiated on the land track 13 as well as the groove track 12.

Figure 1:
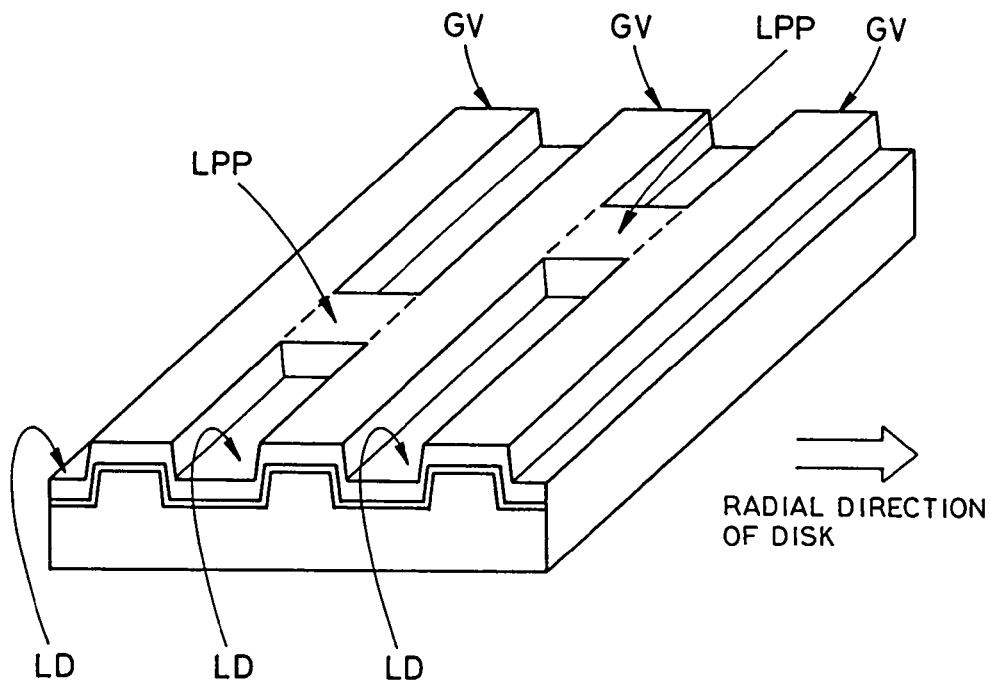
FIG. 1 is a partly cutaway perspective view of a DVD.
Figure 2:
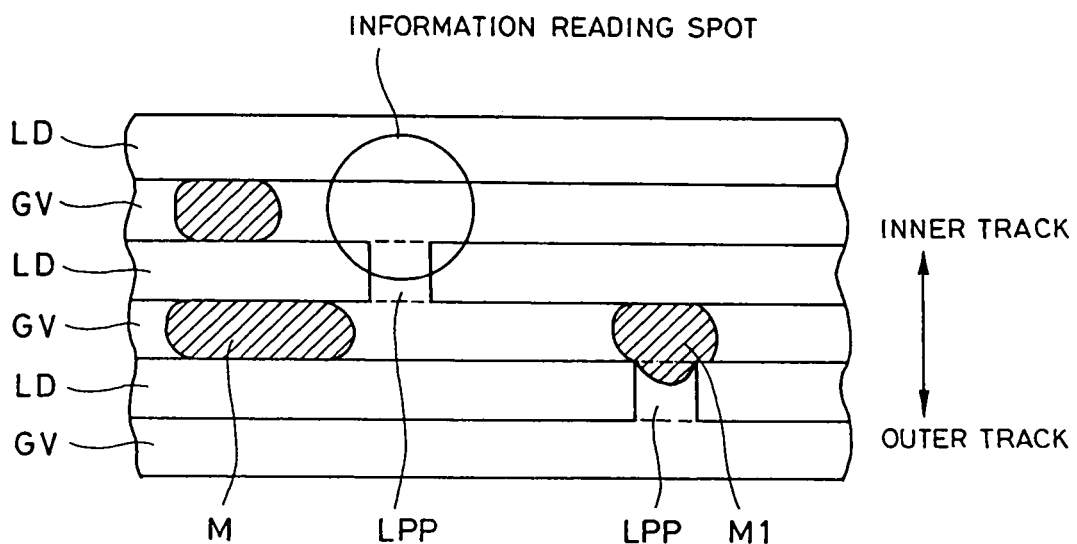
FIG. 2 is a partial plan view of the DVD.
Figure 3:
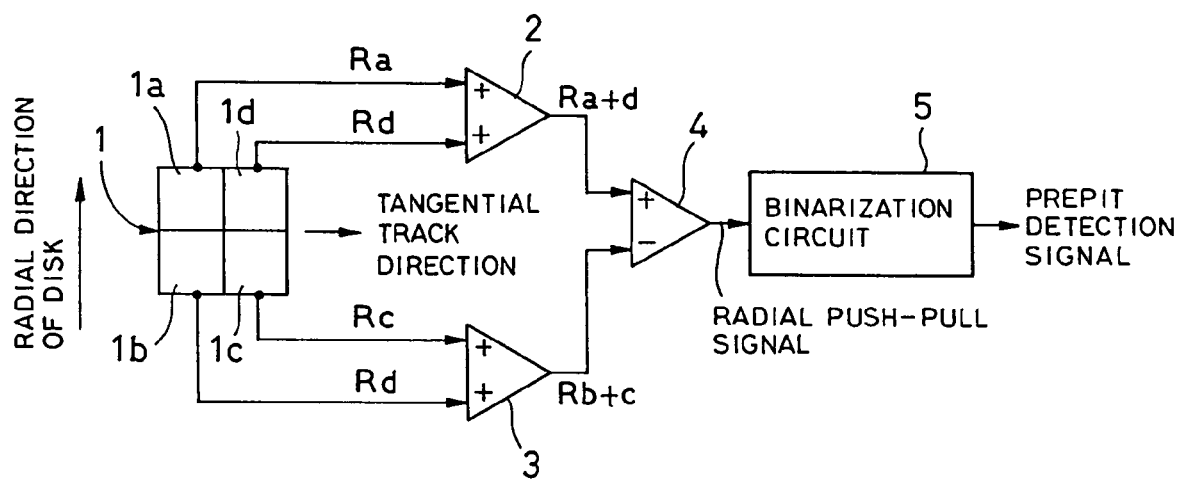
FIG. 3 is a block diagram showing the structure of a prepit detecting unit.
Figure 4:
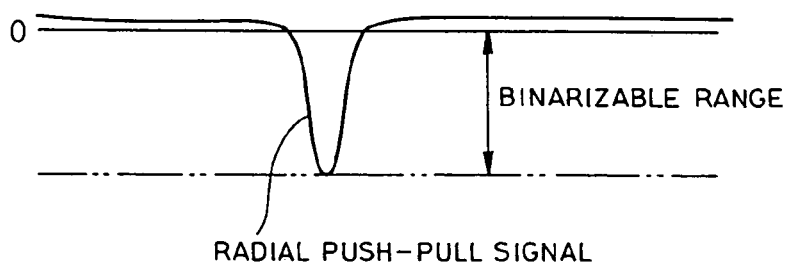
FIG. 4 is a graph showing a radial push-pull signal.

Using reflected light of part of the beam spot SP irradiated on the land track 13, pre information is acquired from the land prepit 14 by a radial push-pull system which uses a photodetector having its light-receiving surface split by a split line parallel to the tangential line (track direction) shown in, for example, FIG. 3 and a wobbling signal is extracted from the groove track 12 to detect a recording clock signal synchronous with the rotation of the disk.

One embodiment of the present invention will be described below in detail.

Figure 8:
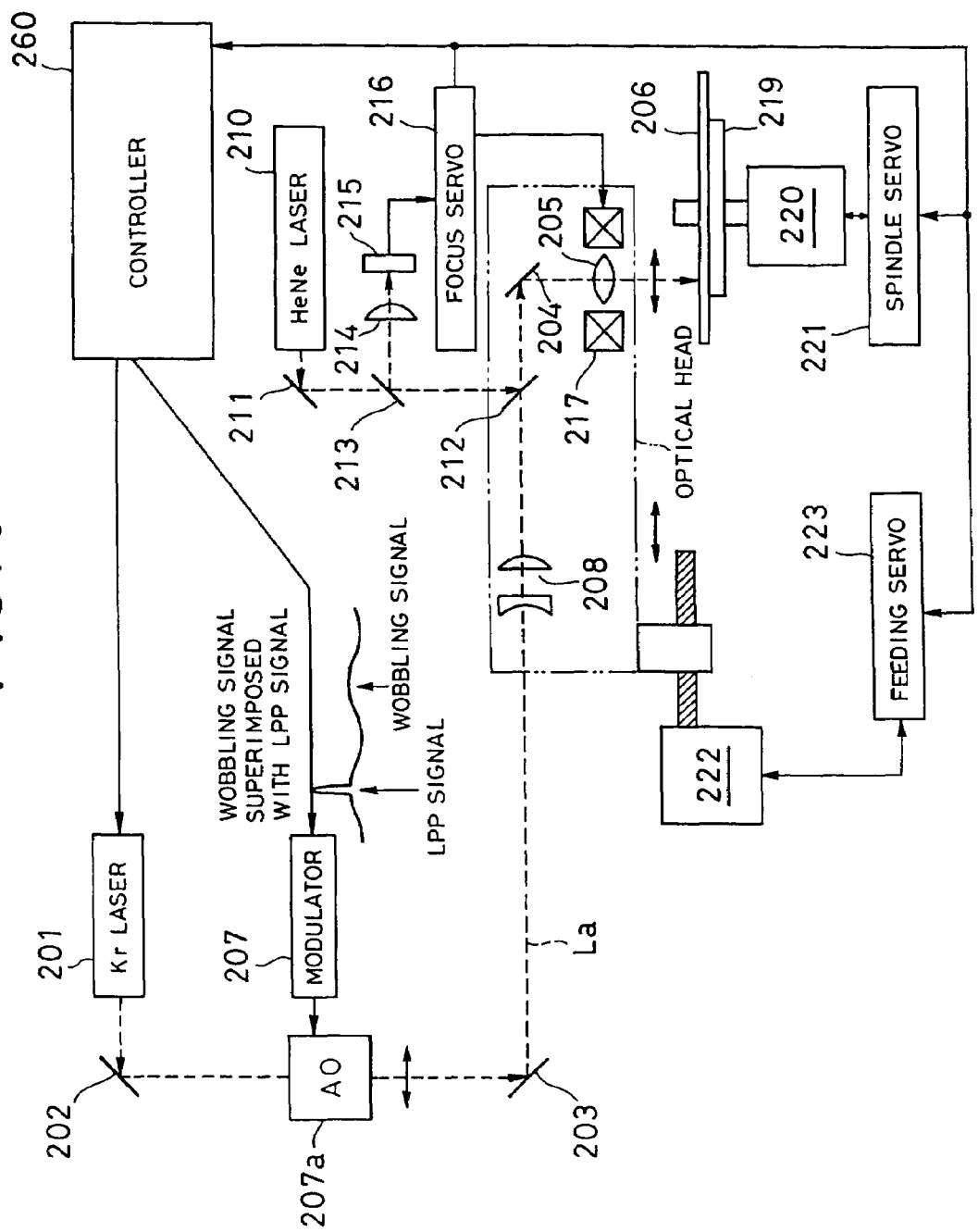
FIG. 8 is a block diagram showing an optical disk cutting apparatus for making a master disk for an optical disk according to the present invention.

FIG. 8 shows an optical disk cutting apparatus for making a master disk for a phase change type optical disk. A Kr laser oscillator 201 generates an exposure light beam. The light beam emitted from the laser oscillator 201 is reflected at reflection mirrors 203 and 204 and enters an objective lens 205. The light beam that has passed the objective lens 205 is irradiated on a recording master disk 206. An AO modulator (Acoustic Optical modulator) 207a is provided between a reflection mirror 202 and the reflection mirror 203 to modulate the light beam in accordance with a video signal and a audio signal to be recorded, which are supplied from an FM modulator 207.

A wedge prism whose non-parallel sides are light entering and emerging sides, AOD (Acoustic Optical Deflector) or rotary mirror is used as the AO modulator 207a. The AOD receives, for example, a high-frequency electric signal having a center frequency of about 300 MHz and executes modulation by utilizing the phenomenon that the diffraction angle of the primary diffracted light is changed by varying the center frequency. The modulator of the type which uses a wedge prism or a rotary mirror controls the drive system, such as a DC motor, stepping motor or a piezo element, which rotates the wedge prism or rotary mirror, and uses the deflection of refracted light and reflected light. The modulated exposure light beam exposes a positive photoresist layer on the rotating recording master disk 206. A beam expander 208 is provided between the reflection mirrors 203 and 204 to enlarge the size of the light beam so that the beam filling the objective lens 205 enters the lens 205.

The optical disk cutting apparatus uses a focus servo optical system including an HeNe laser oscillator 210 in order to actuate the objective lens 205 for focus servo. The light beam emitted from the laser oscillator 210 is reflected by a reflection mirror 211 and a dichroic mirror 212 and merges with the exposure light beam. The resultant light beam enters the reflection mirror 204. The light beam that has passed the objective lens 205 is irradiated on the recording master disk 206. The wavelength and intensity of the focus light beam from the laser oscillator 210 are selected in such a way as not to expose the recording master disk 206. A polarized beam splitter 213 is provided between the reflection mirror 211 and the dichroic mirror 212. The reflected light from the recording master disk 206 passes the objective lens 205, is reflected by the reflection mirror 204 and the dichroic mirror 212 and is then reflected by the polarized beam splitter 213. The resultant reflected light is supplied to a 4-split photodetector 215 via a cylindrical lens 214. Individual output signals of the photodetector 215 are supplied to a focus servo control circuit 216 which in turn drives an actuator 217 of the objective lens 205 according to the output signals of the photodetector 215.

The optical disk cutting apparatus further comprises a spindle servo circuit 221 that controls the rotation of a spindle motor 220 for rotating a turn table 219 which rotates the recording master disk 206 mounted thereon, and an optical head feeding servo circuit 223 that controls the rotation of a drive motor 222 which moves an optical head carrying an optical system or the like including the objective lens 205 in the radial direction of the recording master disk 206.

Under the control of a controller 260 on the laser oscillator 201, FM modulator 207 and the servo systems 216, 221 and 223, the optical disk cutting apparatus forms a track by exposing the positive photoresist layer of the recording master disk 206 with a single light beam modulated with the wobbling signal which is superimposed with an LPP signal, and etching and developing the exposed portion of the positive photoresist layer as a pit.

Figure 9:
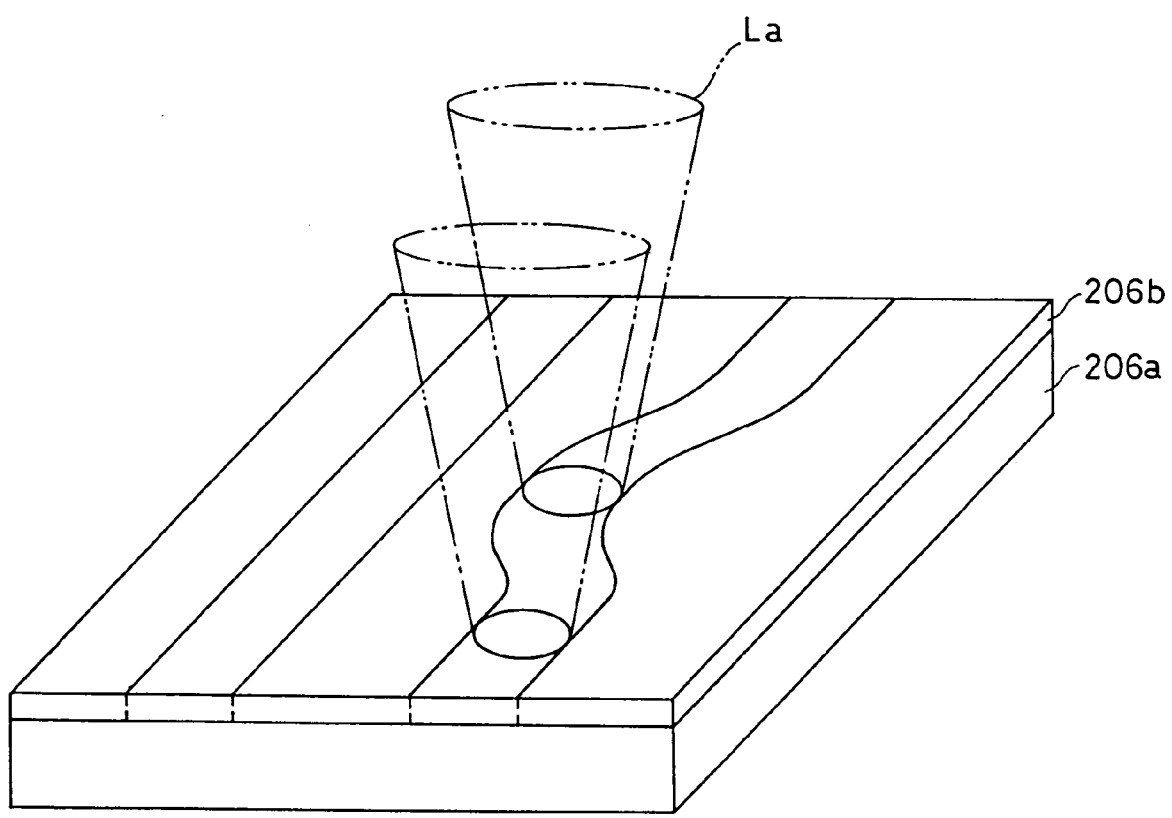
FIGS. 9 and 10 are partly cutaway perspective views of the master disk according to the present invention.

First, the recording master disk 206 which has a photoresist layer 206b formed on the major surface of a glass disk 206a is mounted on the turn table 219 of the laser cutting apparatus. Then, as shown in FIG. 9, the table 219 is turned and a cutting light beam La modulated with the wobbling signal that is superimposed with an LPP signal is focused on the photoresist layer 206b while moving the cutting light beam La on the master disk spirally or concentrically to shift the spot of the cutting light beam La in a direction perpendicular to the extending direction of the groove track 12. The shifted spot is returned to the position where the groove track 12 is to be extended, thus forming the latent image of the track on the photoresist layer 206b. As the LPP-signal superimposed wobbling signal is used at this time, the cutting light beam spot wobbles at a given interval at the second amplitude greater than the first amplitude, as shown in FIG. 6.

Next, the exposed photoresist master disk is placed in a developing apparatus and is developed to remove the latent image portion, thus yielding a developed master disk.

Figure 10:
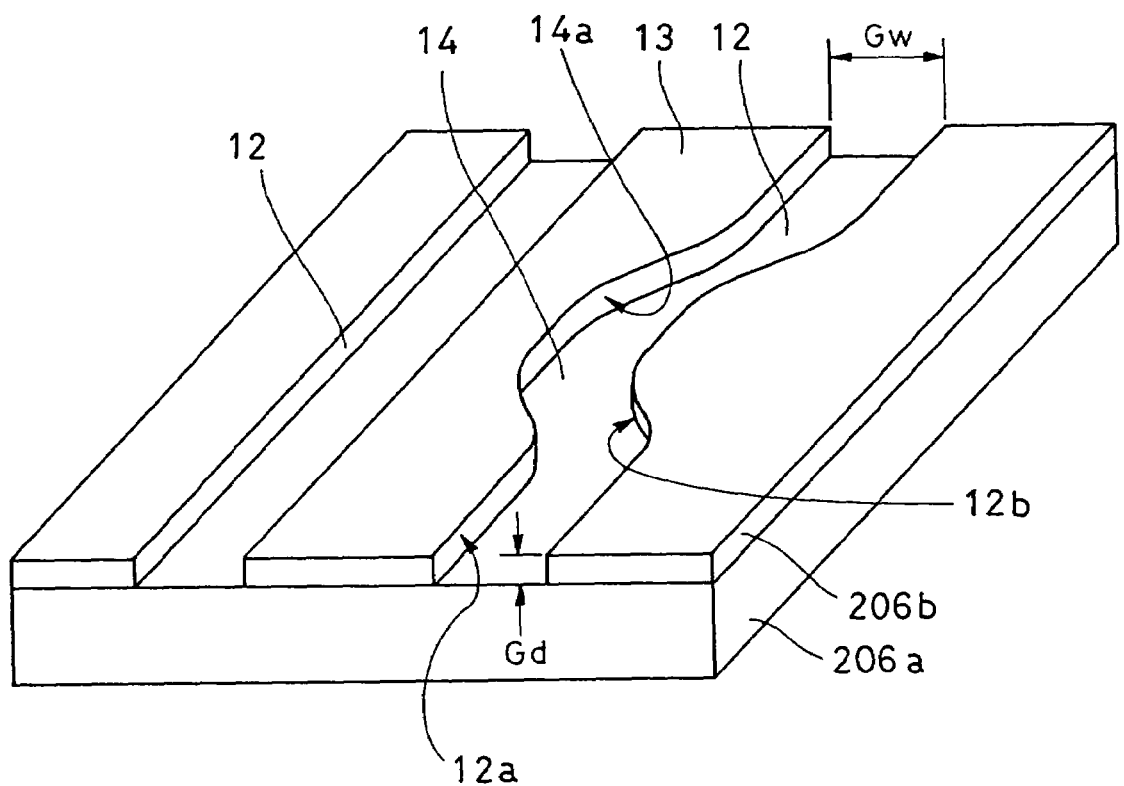

As shown in FIG. 10, the land prepit 14 having a side defined by a curved surface continual from the side of the groove track 12 is formed on the master disk as a curved surface which strictures the groove track 12 opposing the side of the land prepit 14 by the side of the groove track 12. Accordingly, the side of the land prepit 14 has a radius of mean curvature smaller than the radius of mean curvature of the side of the groove track 12 in the land-prepit absent region.

Next, post baking is performed to fix the master disk after which a conductive film of nickel or silver is formed on the photoresist layer 206b by sputtering or vapor deposition and a nickel stamper is formed by, for example, electroforming. The nickel stamper is separated from the glass disk 206a. Using the stamper, a replica of a resin optical disk substrate having predetermined pre information identical to the one shown in FIG. 10 is made by, for example, injection molding or a so-called 2P scheme.

A protection film, a medium layer of a phase change material, a protection film and a reflection film, for example, are formed on the obtained optical disk substrate one on another and another substrate is adhered to the resultant substrate by an adhesive layer, thus yielding an optical disk shown in FIG. 5.

A description will now be given of optimal values for the length of the land prepit 14 in a tangential-to-track direction (LPP length (μm)) and the amount of shift of the land prepits in the direction perpendicular to the tangential-to-track direction (LPP shift (μm)).

According to the recording medium of the present invention as described above, the land prepit 14 is formed by sharply shifting the groove track 12 in the direction perpendicular to the track extending direction. Therefore, the length and shift amount (FIG. 7) of the land prepit 14 significantly influences a reproduction signal (RF signal) of a pit recorded on the groove track 12 as well as the detection signal level of the land prepit itself.

According to the recording format of a DVD, pits to be formed on a groove track can take any of lengths 3T to 11T and 14T. 3T to 11T are given mainly by an information signal undergone 8–16 modulation while 14T is given by a sync signal (sync code) added to the head of each sync frame of an information signal.

As is well known, the width of a change in an RF signal with respect to a pit of 3T is the smallest. The present inventors confirmed through experiments that when the offset level of the RF signal (RF offset) by the land prepit became equal to or greater than 0.05, erroneous reading of the shortest 3T pit started. Note that level 1 indicates the level of the entire amount of reflected light when a non-recorded groove track is reproduced. The DVD format specifies the detection signal level of the land prepit (LPP level) to be 0.18 to 0.27.

Therefore, the length and shift amount of the land prepit according to the present invention are set in such a way that the RF offset is less than 0.05 and the LPP level lies in a range of 0.18 to 0.27.

Figure 11:
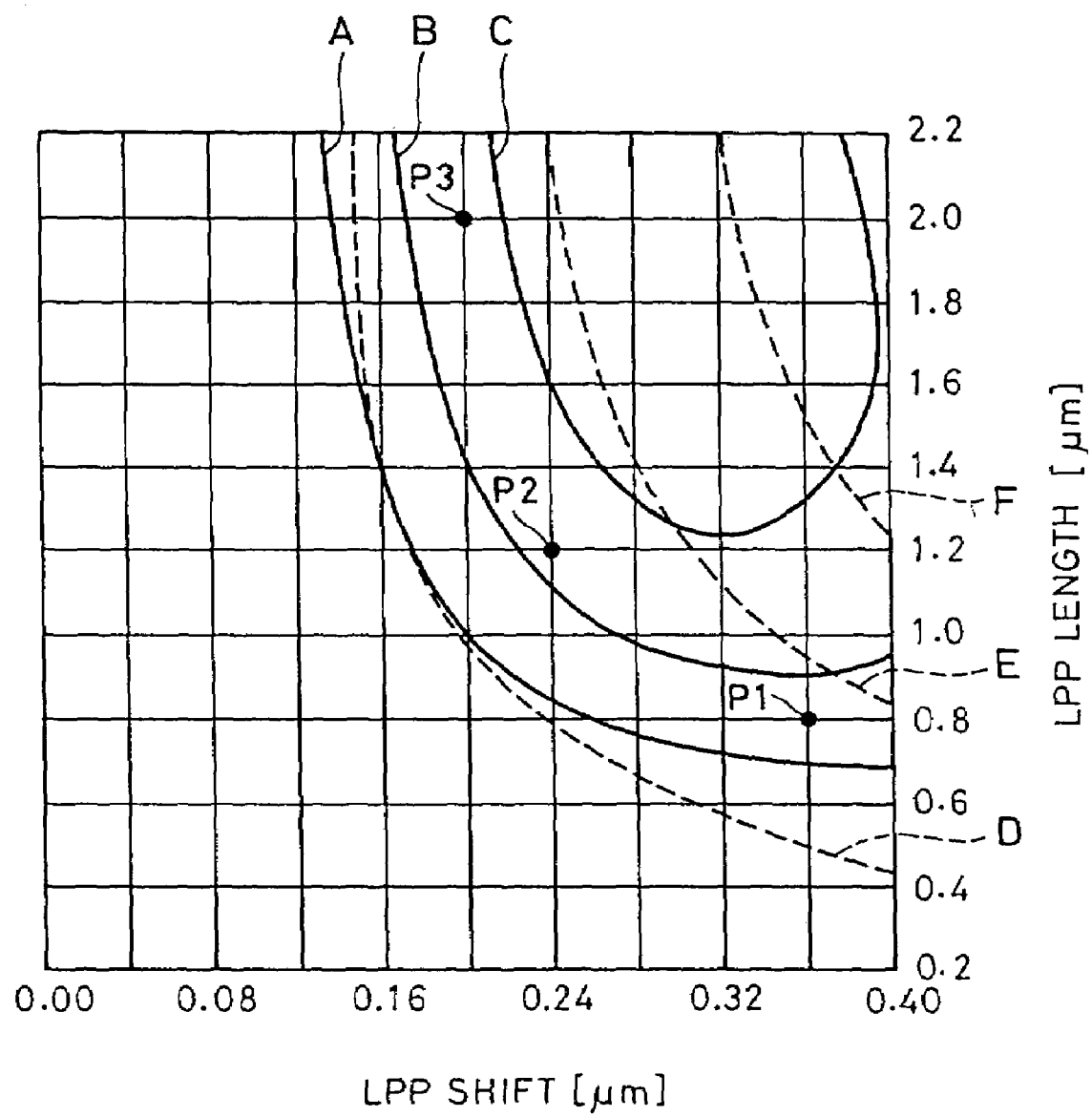
FIG. 11 is a graph showing the level range of a land prepit signal acquired from an optical disk according to the present invention.

FIG. 11 exemplifies the possible range of the length and shift amount of the land prepit 14 that satisfies those two conditions. The width, Gw, and the depth, Gd, of the groove track 12 in the diagram are respectively set to 0.25 μm and 0.030 μm.

In FIG. 11, a solid line A is a conditional line on which the LPP level becomes 0.18, a solid line B is a conditional line on which the LPP level becomes 0.21, and a solid line C is a conditional line on which the LPP level becomes 0.24. In this embodiment, there is no conditional line on which the LPP level becomes equal to or greater than 0.27. It is apparent that the possible range of the length and shift amount of the land prepit 14 that permits the LPP level to lie in a range of 0.18 to 0.27 is an area to the upper right of the solid line A.

A broken line D is a conditional line on which the RF offset becomes 0.02, a broken line E is a conditional line on which the RF offset becomes 0.05, and a broken line F is a conditional line on which the RF offset becomes 0.08. Therefore, the possible range of the length and shift amount of the land prepit 14 that permits the RF offset to be less than 0.05 is an area to the lower left of the solid line E.

In view of the above, the possible range of the length and shift amount of the land prepit 14 that satisfies the aforementioned two conditions (RF offset <0.05 and LPP level=0.18 to 0.27) is an area lying between the solid line A and the broken line E in FIG. 11 and the length and shift amount of the land prepit 14 can be set freely within this area. For example, the length of the land prepit is set to 0.80 µm and the shift amount is set to 0.36 µm as indicated by a point P1, or the length of the land prepit is set to 1.2 µm and the shift amount is set to 0.24 µm as indicated by a point P2, or the length of the land prepit is set to 2.0 µm and the shift amount is set to 0.20 µm as indicated by a point P3.

Attention should be paid because the individual conditional lines shown in FIG. 11 shift in accordance with the values of the width Gw and the depth Gd of the groove track. The conditional lines A to C for the LPP level are shifted lower leftward in the diagram as the width Gw of the groove track is widened to 0.30 µm, 0.35 µm and so forth, and are shifted upper rightward in the diagram as the width Gw is made narrower. The conditional lines A to C are also shifted lower leftward in the diagram if the depth Gd of the groove track is made deeper than 0.25 µm, and are shifted upper rightward in the diagram as the depth Gd is made shallower. The conditional lines D to F for the RF offset are shifted upper rightward in the diagram as the width Gw of the groove track is made wider, and are shifted lower leftward in the diagram as the width Gw is made narrower. The conditional lines D to F are shifted lower leftward if the depth Gd of the groove track is made deeper, and are shifted upper rightward as the depth Gd is made shallower.

According to the present invention, as described above, the land prepits have a radius of mean curvature smaller than a radius of mean curvature of sides of the groove tracks in land-prepit absent regions where the land prepits do not exist and are defined by curved surfaces continuously extending from the sides of the groove tracks, and those sides of the groove tracks which face the continuous curved surfaces of the land prepits are curved surfaces that stricture the groove tracks. This structure can ensure accurate detection of prepits.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2000-202246 which is hereby incorporated by reference.

What is claimed is:

1. A method of manufacturing a recording medium having pairs of groove tracks and land tracks provided side by side while being bent periodically, a plurality of land prepits previously formed on said land tracks and carrying information about said groove tracks, and a recording layer formed on at least said groove tracks and said land tracks, said method comprising the steps of:

forming said groove tracks extending by irradiating a spot of a cutting light beam, which moves relatively to a recording master disk, on a photoresist layer formed on said recording master disk; and shifting said spot of said cutting light beam in a direction perpendicular to a direction in which said groove tracks extend, returning said shifted spot to a position where said groove tracks should extend, thereby forming said land prepits having sides defined by curved surfaces continuously extending from sides of said groove tracks, and making those sides of said groove tracks which face said sides of said land prepits having curved surfaces stricturing said groove tracks, wherein said sides of said land prepits have a radius of mean curvature smaller than a radius of mean curvature of sides of said groove tracks in non-present regions of said land prepits.

2. A method according to claim 1, wherein said spot is caused to wobble with a first amplitude in said step of forming said groove tracks, and said spot is caused to wobble with a second amplitude greater than said first amplitude in said step of forming curved sides which stricture said groove tracks and curved sides which define said land prepits.

3. A method according to claim 1, wherein a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range.

4. A method according to claim 3, wherein said predetermined value is 0.05 and said predetermined range is 0.18 to 0.27.

5. A method according to claim 1, wherein a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range, and wherein said predetermined range is 0.18 to 0.27.

6. An apparatus for manufacturing a recording medium having pairs of groove tracks and land tracks provided side by side while being bent periodically, a plurality of land prepits previously formed on said land tracks and carrying information about said groove tracks, and a recording layer formed on at least said groove tracks and said land tracks, said apparatus comprising:

a track forming section for forming said groove tracks extending by irradiating a spot of a cutting light beam, which moves relatively to a recording master disk, on a photoresist layer formed on said recording master disk; and a land-prepit forming section for shifting said spot of said cutting light beam in a direction perpendicular to a direction in which said groove tracks extend, returning said shifted spot to a position where said groove tracks should extend, thereby forming said land prepits having sides defined by curved surfaces continuously extending from sides of said groove tracks, and making those sides of said groove tracks which face said sides of said land prepits having curved surfaces stricturing said groove tracks wherein said sides of said land prepits have a radius of mean curvature smaller than a radius of mean curvature of sides of said groove tracks in non-present regions of said land prepits.

7. An apparatus according to claim 6, wherein said spot is caused to wobble with a first amplitude in said track forming section, and said spot is caused to wobble with a second amplitude greater than said first amplitude in said land-prepit forming section.

8. An apparatus according to claim 6, wherein a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range.

9. An apparatus according to claim 8, wherein said predetermined value is 0.05 and said predetermined range is 0.18 to 0.27.

10. An apparatus according to claim 6, wherein a length of said land prepits in a tangential-to-track direction and a width of said land prepits in a direction perpendicular to said tangential-to-track direction are set to values that allow an offset level of an information signal reproduced from said groove tracks by said land prepits to be smaller than a predetermined value and a signal level of said land prepits to lie within a predetermined range, and wherein said predetermined range is 0.18 to 0.27.

11. A recording medium manufactured with the apparatus according to claim 6.

* * * * *